US005557969A

United States Patent [19]
Jordan

[11] Patent Number: 5,557,969
[45] Date of Patent: Sep. 24, 1996

[54] APPARATUS AND METHOD FOR DETECTION ULTRASONIC WAVES PROPAGATED FROM WITHIN A SELECTED DISTANCE

[75] Inventor: John Jordan, Oldsmar, Fla.

[73] Assignee: Energy and Environmental Technologies Corporation, Santa Rosa, Calif.

[21] Appl. No.: 495,099

[22] Filed: Jun. 27, 1995

Related U.S. Application Data

[63] Continuation-in-part of Ser. No. 213,129, Mar. 15, 1994, abandoned.

[51] Int. Cl.⁶ .................................................. G01N 29/20
[52] U.S. Cl. .......................... 73/592; 73/40.50 A; 73/599
[58] Field of Search ................................ 73/40.5 A, 592, 73/597, 599, 600, 602, 646, 596

[56] References Cited

U.S. PATENT DOCUMENTS

| | | |
|---|---|---|
| 3,462,240 | 8/1969 | Bosselaar et al. . |
| 3,903,729 | 9/1975 | Covington . |
| 3,930,556 | 1/1976 | Kasuda et al. . |
| 4,289,019 | 9/1981 | Claytor . |
| 4,290,125 | 9/1981 | Honda . |
| 4,414,850 | 11/1983 | Miwa et al. . |
| 4,583,406 | 4/1986 | Dimeff . |
| 4,635,042 | 1/1987 | Andrews . |
| 4,738,137 | 4/1988 | Sugg et al. . |
| 4,785,659 | 11/1988 | Rose et al. . |
| 4,858,462 | 8/1989 | Coulter et al. . |
| 4,958,296 | 9/1990 | Saitoh et al. . |
| 5,040,409 | 8/1991 | Kiewit . |
| 5,103,675 | 4/1992 | Komninos . |

FOREIGN PATENT DOCUMENTS

| | | | |
|---|---|---|---|
| 3101928 | 8/1992 | Germany . | |
| 58-34334 | 2/1983 | Japan | 73/405 A |

OTHER PUBLICATIONS

Encyclopedia of Electronics, 2nd ed., Gibilisco and Sclater, 1990, p. 126.
The Encyclopedia of Electronic Circuits, Graf, 1985, pp. 128, 203, 601 and 729.

*Primary Examiner*—Hezron E. Williams
*Assistant Examiner*—Nashmiya Ashraf
*Attorney, Agent, or Firm*—Brumbaugh, Graves, Donohue & Raymond

[57] ABSTRACT

An ultrasonic leak detector which discriminates against leak signals originating from outside a desired detection zone. Incoming ultrasonic waves are divided into mutually exclusive low and high frequency signals, which signals are then processed to form an intensity ratio. The intensity ratio is compared to a pre-selected ratio corresponding to an ultrasonic source at the boundary of the detection. Ultrasonic leak signals originating from outside the desired detection zone are ignored. The presence of a leak within the detection zone is indicated by audio and/or visual devices.

19 Claims, 3 Drawing Sheets

[5,557,969]

APPARATUS AND METHOD FOR DETECTION ULTRASONIC WAVES PROPAGATED FROM WITHIN A SELECTED DISTANCE

This application is a continuation-in-part of application Ser. No. 08/213,129, filed on Mar. 15, 1994, which is abandoned as of the filing date granted for this continuation-in-part application.

FIELD OF THE INVENTION

The present invention relates in general to ultrasonic source detection systems and, in particular, to methods and apparatus for ultrasonic source detection which process ultrasonic signals received from two mutually exclusive frequency spectrums so as to enable only ultrasonic signals originating from within a desired detection zone to be discriminated from ultrasonic signals emanating from outside the desired detection zone.

BACKGROUND OF THE INVENTION

Detection of ultrasonic signals can be useful in various situations. A common example is the detection of leaks in equipment using compressed air or other gases, such as lines and hoses used to supply compressed air to pneumatic power tools and equipment in industrial settings. Leaks can occur as a result of cuts or cracks in the lines, and ultrasonic waves are generated as compressed air escapes through a cut or crack. For reasons of safety and economy, it is essential that compressed air lines be continuously monitored for defects.

A basic knowledge of sound wave principles is necessary for the understanding of the process of detecting leaks by analyzing ultrasonic waves. The audible sound wave spectrum covers wave frequencies beginning at ≈20 Hz and ending at ≈20 kHz. Waves with higher frequencies are considered ultrasonic. Sound emanating from a source will typically be a composite of waves over a wide frequency range. As a wave travels farther away from its source it attenuates or flattens out, and it is well known in the art that higher frequency waves attenuate at faster rates than low frequency waves.

Numerous prior art devices have been developed to detect leaks. U.S. Pat. No. 3,462,240 discloses an instrument which detects and amplifies acoustic vibrations caused by fluid flowing through a hole in a pipeline. It divides the vibrations into high and low frequencies, and produces an alarm when one signal band generates a higher intensity than the other signal band.

U.S. Pat. No. 5,040,409 provides for an apparatus and method for detecting when a pipe break in a sprinkler system occurs. This device also generates an alarm when one frequency band produces a higher intensity reading than another frequency band.

U.S. Pat. No. 4,635,042 discloses a device for locating the sources of ultrasonic sound within a narrow frequency band indigenous to vacuum leaks through the utilization of a hand-held probe containing a transducer exhibiting a sensitivity peak within the band, at about 40 kHz, and at least one other sensitivity peak outside the narrow band.

U.S. Pat. Nos. 4,289,019, 4,785,659, 4,858,462 and 4,958,296 also propose devices for detecting leaks in pipes or hoses.

While the foregoing devices are effective in detecting leaks and are in widespread use, they are subject to high levels of interference by originating sources other than the leak and often give false indications of a leak in response to the detection of ultrasonic signals from sources other than gas leaks that are commonly present in industrial environments. Moreover, when two ultrasonic leaks exist simultaneously, previously known devices are often incapable of distinguishing between leaks within the desired detection zone and leaks outside the desired detection zone.

Accordingly, it is desirable to have ultrasonic leak detection apparatus and methods that can distinguish between simultaneous leaks within a selected detection zone and outside the zone, and that can eliminate additional interference to indicate only sources located within the selected zone.

SUMMARY OF THE INVENTION

In accordance with the present invention, apparatus and methods are provided to identify ultrasonic waves propagating from a source located within a desired distance while discriminating against ultrasonic waves transmitted from sources outside the desired detection area. The invention enables the generation of an output signal whose amplitude is representative of only the ultrasonic waves propagated from a source located within the desired distance.

Basically, the invention selectively detects ultrasonic waves originating within a desired detection zone by detecting ultrasonic waves within mutually exclusive low and high frequency ranges, producing intensity and frequency signals in the respective channels, continuously comparing the ratio of normalized low and high intensity signals to a predetermined ratio indicative of a selected distances so as to produce an amplitude signal indicating the intensity of incident ultrasonic waveforms propagated from a source located within the selected range and correcting for signals emanating from outside the range, and processing the frequency signals and the amplitude signals to produce an output signal indicative of the waveforms originating from the ultrasonic leak with background interference removed.

In accordance with a further feature of the invention, an adjustable ratio selector is provided to allow the user to vary the size of the detection zone to meet a wide range of applications and detection distances.

Still another feature of the invention is to provide a system with a numerical display whose scale is repeatable and whose output is directly proportional to the average intensity of the incident ultrasound with the interference from ultrasound waves emanating from outside a selected zone removed.

Yet a further feature of the invention is to provide a system with an audible output allowing the user to hear sounds representative of the intensity and frequency variations in ultrasonic signals with the interference removed.

BRIEF DESCRIPTION OF THE DRAWING

Further objects, features and advantages of the invention will become apparent from the following detailed description taken in conjunction with the accompanying figures showing a preferred embodiment of the invention, in which.

DESCRIPTION OF A PREFERRED EMBODIMENT

The present invention is directed to an apparatus for ultrasonic leak detection which ignores ultrasonic leaks emitting waves from outside a desired detection zone. The invention applies the principle that high frequency waves attenuate more rapidly than low frequency waves to significantly improve ultrasonic wave detection. At an established distance, a predictable attenuation ratio can be developed by comparing the high frequency attenuation at that distance to the low frequency attenuation at that distance.

Since high frequency waves attenuate more rapidly, the attenuation ratio will decrease as the ultrasonic waves travel farther from the source. Thus a compressed air leak at five feet away will have a higher ratio than the same leak at twenty five feet away. The high frequency wave at five feet will have attenuated less with respect to its corresponding low frequency wave than at twenty five feet.

Figure 1:
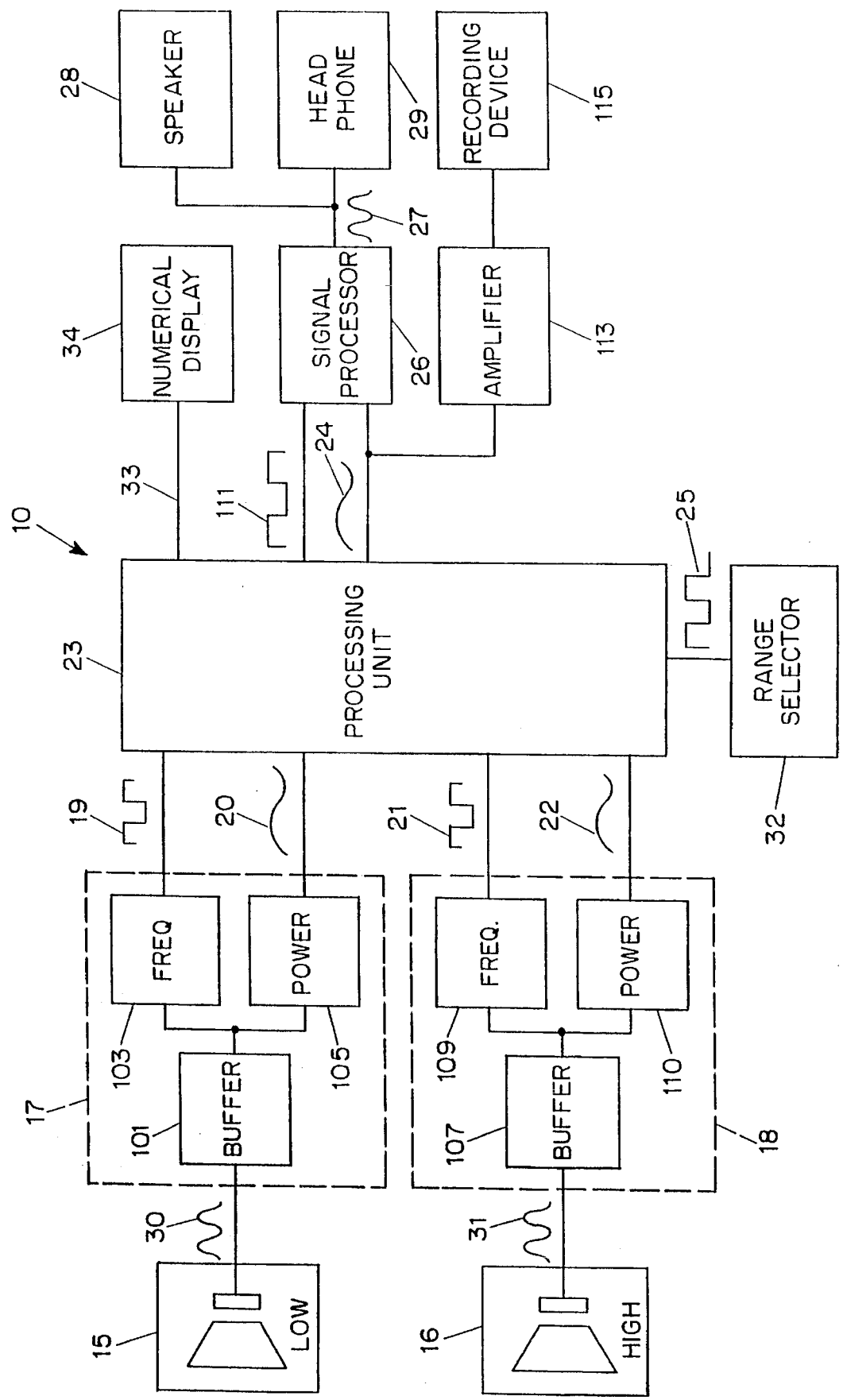
FIG. 1 is a schematic diagram of an embodiment of the ultrasonic wave detection apparatus in accordance with the invention.

FIG. 1 is a schematic diagram of an ultrasonic wave detection apparatus in accordance with the invention. The apparatus, indicated generally at 10, includes two wave detectors 15, 16 monitoring mutually exclusive frequencies. Low frequency detector 15 monitors ultrasonic waves centered around a low frequency (e.g., 30–40 kHz, 37 kHz in the preferred embodiment) and produces a low frequency signal 30. High frequency detector 16 monitors ultrasonic waves centered around a high frequency spectrum (e.g., 40–50 kHz, 41 kHz in the preferred embodiment) and produces a high frequency signal 31. Detectors 15 and 16 comprise conventional piezoelectric transducers in this preferred embodiment, whose operation is well known in the art.

In a manner more fully described below, signal processing means 17 continuously processes the low frequency signal 30 to produce a corresponding intensity signal 20 representing the average power of the low frequency signal 30 and a frequency signal 19 representing the frequency of the low frequency signal 30. Similarly, signal processing means 18 continuously processes the high frequency signal 31 to produce a corresponding intensity signal 22 representing the average power of the high frequency signal 31 and a frequency signal 21 representing the frequency of the high frequency signal 31.

Processing means 17 which operates on the low frequency signal 30 comprises a buffer amplifier stage 101 which is connected to both a zero-crossing detector circuit 103 and a power level meter circuit 105, all of which are conventional circuits. Buffer stage 101 is used in a conventional manner and is used to stabilize the oscillation frequency of the transducer in detector 15. A more detailed description of a common buffer stage that can be used for this purpose is found in *Encyclopedia of Electronics*, 2nd edition, edited by Gibilisco and Sclater, 1990, at page 126; and *The Encyclopedia of Electronic Circuits*, by Rudolf Graf, 1985, at p. 128.

Zero crossing detector circuit 103 is used in a conventional manner and is used to produce square waves indicative of the frequency of the inputted signal by generating a signal each time the input signal crosses the zero amplitude level. A more detailed description of a common zero crossing detector circuit which can be used appears in *The Encyclopedia of Electronic Circuits*, by Rudolf Graf, 1985, at p. 729.

Power level circuit 105 is also used in a conventional manner and is used to detect the average power of the incoming signal. The output voltage of the power level meter circuit 105 is directly proportional to the average power of the incoming signal. A more detailed description of a power level meter circuit which can be used appears in *The Encyclopedia of Electronic Circuits*, by Rudolf Graf, 1985, at p. 203.

High frequency processor 18, which operates on high frequency signal 31, also comprises similar circuits of a buffer amplifier circuit 107, a zero crossing detector circuit 109 and a power level circuit 111 which operate in the same manner, and may take the same form, as their counterpart circuits in low frequency processor 17.

Signal processing means 17, 18 can also include a feedback loop (not shown) to buffer amplifier circuits 101, 107 for automatically adjusting the amplifier gain with reference to the level of the incident ultrasonic source. The amplifiers preferably have a constant high gain. Intensity signals 20, 22 and frequency signals 19, 21 are connected to processing unit 23 for further processing.

Processing unit 23 includes a conventional multiplexer, two conventional analog to digital (A/D) convertors, a microprocessor, and a conventional digital to analog (D/A) convertor, all of which will be explained in detail in the discussion of FIG. 2. The multiplexer selects which signal (intensity signal 20 or 22 or frequency signal 19 or 21) is inputted into the microprocessor. The A/D convertors convert all analog intensity signals to digital signals which can then be processed by the microprocessor. The microprocessor then processes the input signals in accordance with the invention as further described below. The microprocessor forms an intensity ratio for the incident ultrasonic waveforms by dividing the digitized high frequency intensity signal 22 by the digitized low frequency intensity signal 20.

In order to operate the apparatus, a selected distance is chosen by the operator in which only signals representative of ultrasonic waveforms propagated from a source within that selected distance are sent to a notification device while waveforms emanating from outside the selected distance are ignored. The selected distance is chosen by the operator by using range selector means 32, such as a switch located on an external surface of the apparatus 10, which produces a range signal 25 indicating the desired range of detection. The range selector means 32 could enable a selection of 5 feet, 10 meters, or any amount of distance depending upon the configuration of the system. Range selector means 32 can also be an attachable keyboard that communicates with the processing unit 23.

The microprocessor accesses a memory to retrieve the stored intensity ratio corresponding to the range signal 25. The retrieved selected ratio corresponds to the expected attenuation rates of the low and high frequency signals at the selected distance. The microprocessor then compares the calculated intensity ratio of the incident ultrasonic waves to the retrieved selected ratio. The outcome of that comparison controls the output of the microprocessor (and correspondingly processing unit 23) in accordance with the invention described below. Processing unit 23 produces an amplitude signal 24 indicative of the average intensity of the incident low frequency ultrasonic waves and the high frequency ultrasonic waves from only leaks emanating from a source within the selected range, which is described in more detail below.

Signal processor 26 receives amplitude signal 24 from processing unit 23. Signal 24 contains the amplitude component of the output waveform to be indicated. Signal processor 26 also preferably receives a frequency signal 111 from the processing unit 23. Signal 111 is the average of the low and high frequency components of the incident ultrasonic waves. Alternatively, only the high frequency signal 21 or the low frequency signal 19 can be inputted into signal processor 26. In that case, the frequency signal 19 or 21 could be directly connected to the signal processor 26 without being connected to processing unit 23. Signal processor 26 includes a standard wave shaper circuit used in a conventional way to produce an analog signal formed from the frequency signal component 111 and the amplitude signal component 24. An example of a wave shaper circuit which can be used for this purpose is found in *The Encyclopedia of Electronic Circuits*, by Rudolf Graf, 1985, at p. 601.

Depending on the makeup of amplitude signal 24 as further described in connection with FIG. 3, the wave shaper circuit produces either a signal equivalent to the average intensity and frequency of the incident ultrasonic waves, a signal with a zero amplitude (or no output) or a signal whose intensity is reduced by a percentage (10% in the preferred embodiment) from the average of the original waveforms to account for interference waves. Although a separate display can be used for just the amplitude component, it is advantageous to generate a signal with its representative frequency when a signal emanates from a source located within the desired detection zone because the operator can use the frequency or change in frequency to help discover the source of the leak. Experienced operators can also determine the type of leak qualitatively by the variations in the frequency of the output signal.

As shown in FIG. 1, the microprocessor in processing unit 23 is also connected by lead 33, carrying a signal equivalent to amplitude signal 24 but in digital form, directly to a numerical display 34 which is of conventional design with a repeatable scale and which has an output that is directly proportional to the average intensity of the incident ultrasonic waves with the interference from the ultrasonic waves outside a selected zone removed. Signal processor 26 also includes circuitry to reduce the frequency component 111 to an audible range and produce a second output 27 which is a representative audible tone varied in frequency and intensity inn accordance with the incident ultrasonic source. Audible output 27 is then connected to speaker 28 or headphones 29 of conventional design.

The microprocessor in unit 23 is also coupled to amplifier 113 which is connected to recorder 115 to record the amplitude signal 24 in a conventional manner. Preferably, the recorder 115 records the signal digitally in a memory. Additionally, the data can be recorded on a physical medium such as graph paper or can be recorded by some other conventional means. Recorder 115 creates a record to aid the operator for further analysis and record keeping.

Figure 2:
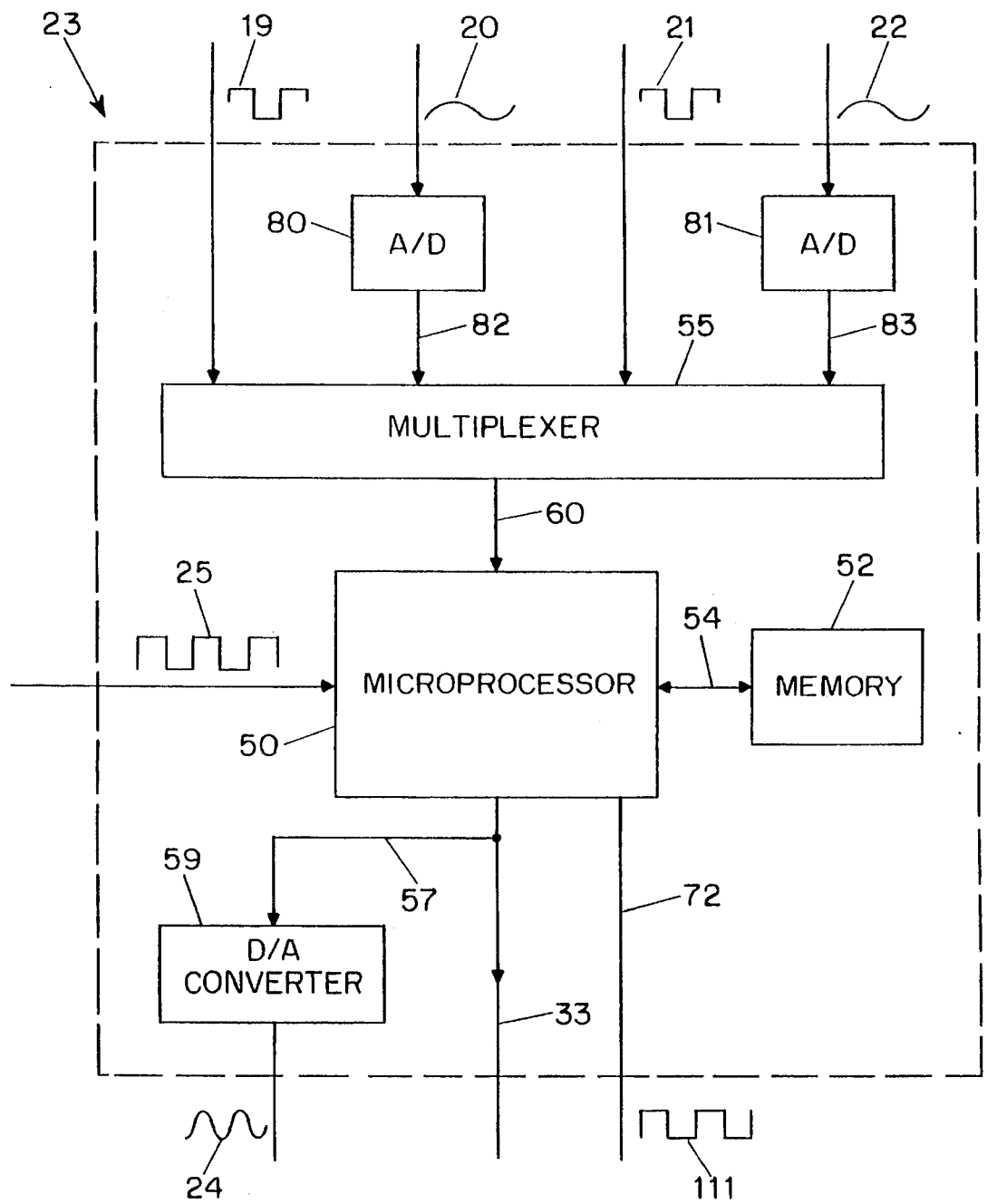
FIG. 2 is a schematic diagram of the processing unit portion of the apparatus of FIG. 1.

FIG. 2 is a block diagram of the processing unit 23. It includes a microprocessor 50, which is connected to a memory 52 via a lead 54 and to a multiplexer 55 via a lead 60. The microprocessor performs, inter alia, data retrieval from the memory 52 and performs comparisons between the retrieved data and a ratio of the inputted high and low frequency intensity signals. Memory 52 can comprise a programmable read only memory (PROM) chip of conventional design. A/D convertor 80 converts low frequency intensity signal 20 to a digital signal and is connected to multiplexer 55 via a lead 82. A/D convertor 81 converts high frequency intensity signal 22 to a digital signal and is connected to multiplexer 55 via a lead 83. Frequency signals 19 and 21 are already in digital form from zero crossing detector circuits 103, 109. Multiplexer 55 selects one of the digital signals 19, 20, 21 or 22 supplied by processing means 17, 18 and A/D convertors 80, 81 and selectively outputs them to microprocessor 50. The microprocessor 50 also receives as an input the selected range signal 25. Selected range signal 25 is generated from a selecting device, such as the switch 32 described above, and is used by the operator to select the distance from within which the source of emanating ultrasonic waves should be identified.

Microprocessor 50 is also connected via a lead 57 to the digital-to-analog (D/A) convertor 59 which converts the digital output of the microprocessor 50 to analog signals. D/A converter 59 then generates the amplitude signal 24 as one output of processing unit 23 representing the amplitude component of the output, which is indicative of the average intensity of the detected ultrasonic waves emanating from sources located within the selected distance zone without other interference. Amplitude signal 24 is further defined in the discussion of FIG. 3. Another lead 33 connects the output of microprocessor 50 in digital form directly to the numerical display 34 as shown in FIG. 1 which digitally displays the average intensity output signal. The signal sent to numerical display 34 is the digital equivalent of analog amplitude signal 24. Microprocessor 50 is also connected to a lead 72 which carries the frequency component signal 111 of the output.

Figure 3:
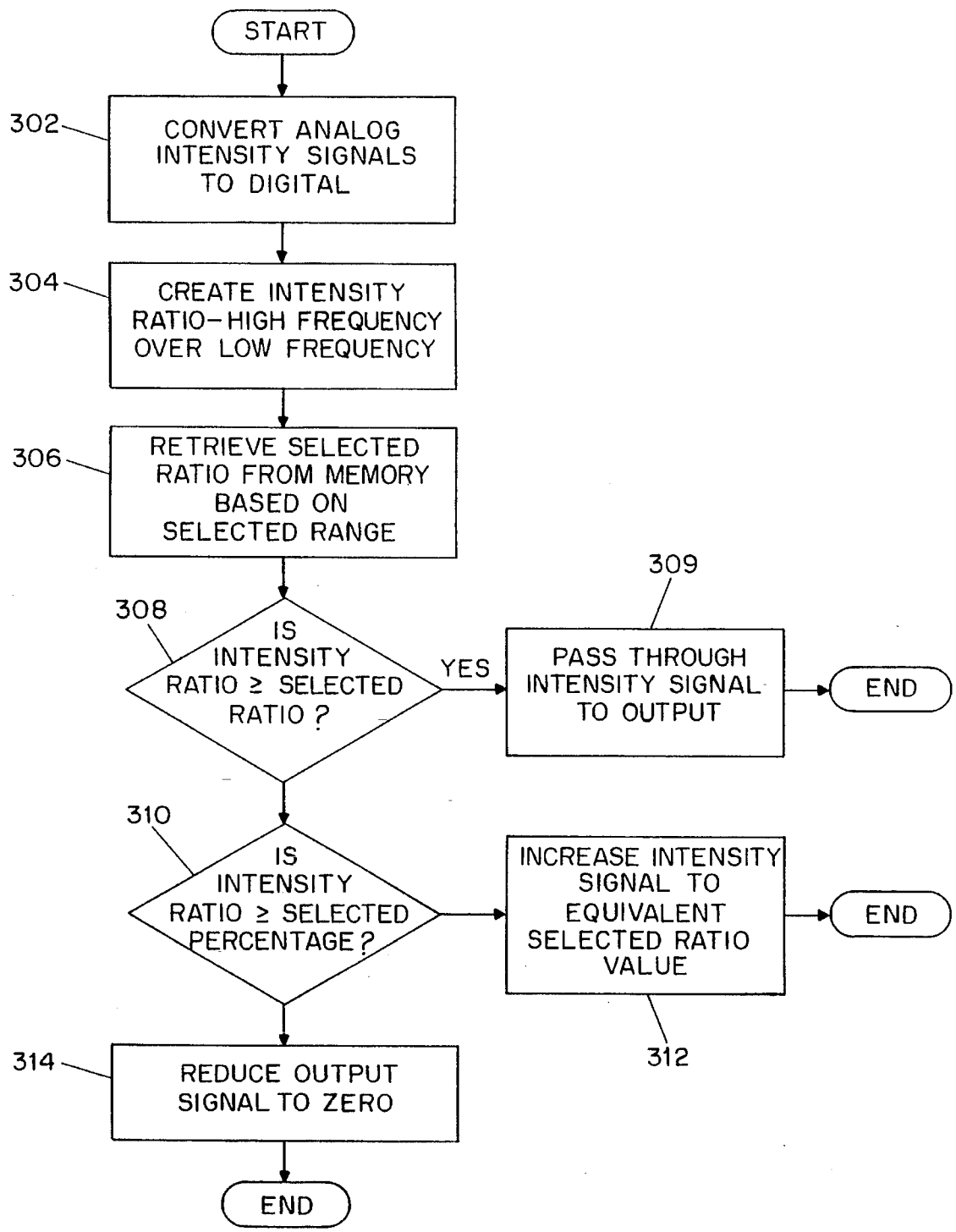
FIG. 3 is a flow chart illustrating a process in the processing unit of FIG. 2.

FIG. 3 is a flow chart of the process employed in processing unit 23 shown in FIG. 2. In step 302, A/D converter 56 converts the analog intensity signals to equivalent digital signals to make them compatible with the inputs of microprocessor 50. Microprocessor 50 then processes the signals and creates an intensity ratio by dividing the high frequency average intensity signal 22 by the low frequency average intensity signal 20 in step 304. In step 306, microprocessor 50 retrieves the chosen ratio stored in memory 52 corresponding to the selected range of detection (range selector 32) and indicated by selected range signal 25. Thus if a five foot range is selected, the range signal 25 and the associated selected ratio will be different than if a 20 foot range is selected. The ratios stored in memory 52 are entered prior to the detection process and can be established through controlled testing. Therefore, the detection zones can be completely user defined based upon the ratios entered for a given application.

Microprocessor 50 then compares the intensity ratio with the selected ratio in step 308. If the intensity ratio is greater than or equal to the selected ratio, the detected ultrasonic signal is determined to be generated from within the selected range because of the level of attenuation and, as indicated in step 309, processing unit 23 generates an amplitude signal 24, which is the connected to the output of microprocessor 50 through a D/A convertor, whose amplitude is representative of the average intensity of the detected ultrasonic waves. In the preferred embodiment, amplitude signal 24 is comprised of the average of the low frequency intensity signal 20 and the high frequency intensity signal 22. Alternatively, the amplitude of amplitude signals 24 in step 309 can be directly proportional to only the high frequency intensity signal 22 or only the low frequency intensity signal 20. The variations in the intensity and existence of a positive amplitude signal are the important factors in the present invention rather than the absolute value of the amplitude at the output. Variations in the displayed intensity can help the operator locate the source of the ultrasonic waves because the intensity of either the high, low, or average of the two will increase as the operator gets closer to the source. In the preferred embodiment, the average value of the intensity signals 20 and 22 are calculated by microprocessor 50 and both low and high intensity signals are inputs to processing unit 23. The amplitude signal 24 is combined with its corresponding frequency component in signal processor 26 so that the operator can view or hear the ultrasonic waves with their original detected characteristics when step 309 is performed. The amplitude signal 24 will then be displayed on selected display and auditory devices.

If the intensity ratio is less than the selected ratio, the process continues. In step 310, if the intensity ratio is greater than or equal to the selected ratio less a specified percentage (10% in this preferred embodiment), so that the ratios are close in value, some interference is indicated from either another source or general noise, and in order to compensate the average of the intensity signals 20 and 22 will be increased by the proportional difference of the ratios to produce an amplitude signal 24 which is indicative of the average of the intensities of the incident waveforms with the interference removed. The specified percentage (10% in this preferred embodiment) can be changed to suit any environment and select the desired tolerance for the interference present.

The interference represents waveforms which will reduce the calculated intensity ratio of the incident waveforms propagated from a source located within the desired distance and therefore distort the associated distance of the detected source. This distortion of the intensity ratio is because the high frequency interference will attenuate faster than the low frequency interference when generated from the same source outside the selected distance causing the intensity ratio to become skewed. The value of the intensity ratio will be decreased when the interference is superimposed on the incident waveforms by increasing the denominator of the intensity ratio by a larger number relative to the increase in the numerator. The calculated intensity ratios also will be decreased because of phase differences between the waveforms and the interfering waves.

An example of removing interference is when the calculated intensity ratio is less than the selected ratio by 5%. In this example, the calculated intensity ratio is within the preferred specified percentage of 10% of the selected ratio so the interference will be compensated for. The average of the intensity signals 20 and 22 would then be increased by 5% (the difference between the selected ratio and the calculated ratio) to compensate for the interference. This would enable the apparatus when detecting a 10 foot radius to indicate a source of leaks located less than 10 feet from the apparatus in which interference made the ultrasonic waves from the leak appear to be outside the detection zone of 10 feet due to the decreased intensity ratio. The calculation accounts for any noise or other waveform source outside the desired range causing interference. The amplitude signal 24 is later combined with the average of the frequency components 19 and 21 so that a waveform representative of the incident ultrasonic waveforms can be displayed to the operator without interference.

If the intensity ratio is less than a selected ratio less a specified percentage in step 310, then the ultrasonic wave is determined to be emanating solely from a source outside the selected range. This is based on the high level of attenuation of the high frequency ultrasonic wave. In step 314, amplitude signal 24 is given a zero value to indicate no leaks have been identified in the desired detection zone and the detected waveform in this case should be ignored. Amplitude signal 24 with a zero value is then combined with the corresponding frequency component signal in the signal processor 26 to generate no signal (signal with a zero amplitude) on the output displays. This would indicate to the operator that no ultrasonic waveforms are propagated from with the selected detection zone.

The foregoing illustrates the principles of the invention as embodied in one form of apparatus for practicing the invention. It will thus be appreciated that those skilled in the art will be able to devise numerous systems and methods which, although not explicitly shown or described herein, embody the principles of the invention and are thus within the spirit and scope of the invention.

For example, a person skilled in the art may use one detector in place of detectors 15 and 16. The apparatus could then include high and low frequency band pass filters of a conventional design to separate the high frequency ultrasonic waves from the low frequency ultrasonic waves. In a similar manner, signal processing means 17 and 18 could be combined into one means with additional inputs and outputs to process both high and low ultrasonic frequency signals.

Alternatively, signal processing means 17 and 18 could be incorporated digitally into the programming of processing unit 23. This would enable the frequency signals 30 and 31 to be modified digitally using conventional digital signal processing techniques after they have passed through the A/D converter 56. This could be beneficial to minimize components failures.

Additionally, the present invention can alternatively contain only the numerical display 34 as the primary display and not include headphones 29 or speaker 28. By only displaying the average amplitude, zero crossing detector circuits 103 and 109 and signal processor 26 could be eliminated four a simpler design.

Finally, the present invention has been described and disclosed in a form in which the various system functions are performed by discrete functional blocks. However, any one or more of these functions could equally well be performed by one or more appropriately programmed micro-processors, micro-coded chips, etc.

I claim:

1. An ultrasonic wave detection apparatus, comprising:

means for detecting ultrasonic waves and generating a first input signal responsive to said ultrasonic waves of a selected low frequency and for generating a second input signal responsive to said ultrasonic waves of a selected high frequency, wherein said selected low and high frequencies are mutually exclusive;

means for processing said first input signal to produce a first frequency signal and a first intensity signal indicative of the frequency and the intensity, respectively, of said first input signal and for processing said second input signal to produce a second frequency signal and a second intensity signal indicative of the frequency and the intensity, respectively, of the second input signal;

means for continuously comparing said first and second intensity signals and producing a third signal indicative of an intensity ratio of the first and second intensity signals;

means for variably selecting a distance from the detection apparatus wherein only ultrasonic waves propagated from a source located within said selected distance will be indicated by said apparatus;

means for generating a fourth signal indicative of an expected intensity ratio corresponding to low frequency and high frequency ultrasonic waves propagated from a source located at said selected distance from said apparatus;

means for continuously comparing said third signal and said fourth signal, and when a predetermined relationship exists between said intensity ratio of said first and second intensity signals and said expected ratio signal, producing a fifth signal representative of the intensity of at least one of said first and second intensity signals;

means for processing at least one of said first and second frequency signals and said fifth signal to produce an output signal; and notification means responsive to said output signal for producing an output indicative of at least one of said first and second input signals propagated from a source located within said selected distance of said apparatus without interference.

2. The apparatus according to claim 1, wherein said detection means comprises a low frequency detecting means for producing said first input signal and a high frequency detection means for producing said second input signal.

3. The apparatus according to claim 1, wherein said processing means comprises a low frequency processing means to process said first input signal and a high frequency processing means to process said second input signal.

4. The apparatus according to claim 1, wherein said notification means comprises at least one of a visual indicator and an audible indicator.

5. The apparatus according to claim 1, wherein said fourth signal generating means comprises:

means for storing at least one said expected intensity ratio; and means for accessing said at least one expected intensity ratio in response to the selection of said selected distance by said selecting means.

6. The apparatus according to claim 5, wherein said storing means comprises a programmable read only memory (PROM) chip.

7. The apparatus of claim 1, further comprising a recorder for recording said fifth signal.

8. The apparatus of claim 1, wherein said fifth signal is representative of an average of said first and second intensity signals.

9. The apparatus of claim 1, wherein said notification means produces an output indicative of an average of said first and second frequency signals and an average of said first and second intensity signals.

10. The apparatus of claim 1, wherein when said intensity ratio of said first and second intensity signals is greater than or equal to said expected intensity ratio, said fifth signal is directly related to at least one of said first and second intensity signals.

11. The apparatus of claim 10, wherein when said intensity ratio of said first and second intensity signals is less than the expected intensity ratio and greater than or equal to said expected intensity ratio less a selected percentage, said fifth signal's amplitude is proportionally greater than at least one of said first and second intensity signals.

12. The apparatus in claim 11, wherein when said intensity ratio of said first and second intensity signals is less than the expected intensity ratio less a selected percentage, said fifth signal's amplitude is zero and no output signal is produced.

13. An ultrasonic wave detection method comprising the steps of:

detecting ultrasonic waves and generating a first input signal produced responsive to said ultrasonic waves of a selected low frequency and generating a second input signal produced responsive to said ultrasonic waves of a selected higher frequency, wherein said selected low and high frequencies are mutually exclusive;

processing said first input signal to produce a first frequency signal and a first intensity signal indicative of the frequency and the intensity, respectively, of said first input signal and processing said second signal to produce a second input frequency signal and a second intensity signal indicative of the frequency and the intensity, respectively, of the second input signal;

continuously comparing said first and second intensity signals and producing a third signal indicative of an intensity ratio of the first and second intensity signals;

variably selecting a distance from a detection apparatus which detects said ultrasonic waves wherein only ultrasonic waves propagated from a source located within said selected distance from said apparatus will be indicated;

generating a fourth signal indicative of an expected intensity ratio corresponding to low frequency and high frequency ultrasonic waves propagated from a source located at said selected distance from a point of detection of the ultrasonic waves;

continuously comparing said third signal to said fourth signal and, when a predetermined relationship exists between said intensity ratio of said first and second intensity signals and said expected intensity ratio, producing a fifth signal representative of at least one of said first and second intensity signals;

processing said first and second frequency signals and said fifth signal to produce an output signal; and producing an output responsive to said output signal indicative of at least one of said first and second input signals propagated from a source located within said selected distance.

14. The method of claim 13, wherein when said intensity ratio of said first and second intensity signals is greater than or equal to the expected intensity ratio, said fifth signal is directly related to at least one of said first and second intensity signals.

15. The method of claim 14, wherein when said intensity ratio of said first and second intensity signals is less than the expected intensity ratio and greater than or equal to said expected intensity ratio less a selected percentage, said fifth signal's amplitude is proportionally greater than at least one of said first and second intensity signals.

16. The method in claim 15, wherein when said intensity ratio of said first and second intensity signals is less than the expected intensity ratio less a selected percentage, said fifth signal's amplitude is zero and no output signal is produced.

17. The method of claim 13, wherein said fifth signal is representative of an average of said first and second intensity signals.

18. An ultrasonic wave detection apparatus comprising:

means for detecting ultrasonic waves and generating a first input signal responsive to said ultrasonic waves of a selected low frequency and for generating a second input signal responsive to said ultrasonic waves of a selected high frequency, wherein said selected low and high frequencies are mutually exclusive;

means for processing said first input signal to produce a first intensity signal indicative of the intensity of said first input signal and for processing said second input signal to produce a second intensity signal indicative of the intensity of the second input signal;

means for continuously comparing said first and second intensity signals and producing a third signal indicative of all intensity ratio of the first and second intensity signals;

means for variably selecting a distance from the detection apparatus within which sources of ultrasonic waves are to be indicated to the exclusion of sources beyond said distance;

means for generating a fourth signal indicative of an expected intensity ratio corresponding to low frequency and high frequency ultrasonic waves propagated from a source located at said selected distance from said apparatus;

means for continuously comparing said third signal and said fourth signal, and when a predetermined relationship exists between said intensity ratio of said first and second intensity signals and said expected intensity ratio, producing a fifth signal indicative of at least one of said first and second intensity signals; and notification means responsive to said fifth signal for producing an output indicative of at least one of said first and second intensity signals propagated from a source located within said selected distance of said apparatus without interference.

19. A method of identifying ultrasonic waves originating within a variably selected predetermined distance, comprising the steps of:

sensing ultrasonic waves having a high frequency component and a low frequency component;

separately determining an intensity of the high frequency component and an intensity of the low frequency component;

generating a first ratio of the intensity of said high frequency component to the intensity of said low frequency component;

generating a second ratio indicative of the expected intensity ratio at said variably selected predetermined distance; and comparing continuously said first and second ratios and producing an output signal indicative of the detection of ultrasonic waves within said variably selected predetermined distance when a predetermined relationship between said first and second ratios exists.

* * * * *